US 6,564,834 B2

(12) United States Patent
Burian et al.

(10) Patent No.: US 6,564,834 B2
(45) Date of Patent: *May 20, 2003

(54) LOAD DISTRIBUTION DEFLECTOR

(75) Inventors: William F. Burian, Downers Grove, IL (US); Charles Lonnie Horne, Chicago, IL (US); James M. McLaughlin, Monee, IL (US); Michael S. Ryan, Darien, IL (US); Clayton Strand, Bolingbrook, IL (US); Marvin Miller, Lockport, IL (US); Malinda Chilcote, Aurora, IL (US)

(73) Assignee: Salco Products, Inc., Lemont, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/884,732

(22) Filed: Jun. 19, 2001

(65) Prior Publication Data

US 2002/0139440 A1 Oct. 3, 2002

Related U.S. Application Data

(63) Continuation-in-part of application No. 09/821,594, filed on Mar. 29, 2001, now Pat. No. 6,408,900.

(51) Int. Cl.⁷ .................................................. B65B 1/04
(52) U.S. Cl. ........................ 141/286; 239/651; 239/507
(58) Field of Search ................................. 141/286, 231, 141/394, 94, 95, 198, 192; 239/651, 650, 505, 507, 513, 222

(56) References Cited

U.S. PATENT DOCUMENTS

| | | | |
|---|---|---|---|
| 598,601 A | 2/1898 | Higbee | 239/511 |
| 816,897 A | 4/1906 | Bray | 239/508 |
| 2,538,413 A | 1/1951 | Chard | 119/51.11 |
| 2,844,914 A | * 7/1958 | Finn | 118/308 |
| 4,944,526 A | 7/1990 | Eberling | |
| 5,626,356 A | 5/1997 | Harwood | |
| 5,660,215 A | * 8/1997 | Krambrock et al. | 141/236 |
| 5,803,502 A | 9/1998 | Noll et al. | |
| 5,868,414 A | 2/1999 | McCoy et al. | |
| 5,871,217 A | 2/1999 | Blanz | |
| 5,984,341 A | 11/1999 | Kass et al. | |
| 6,089,551 A | 7/2000 | Haviland et al. | |
| 6,408,900 B1 | * 6/2002 | Burian et al. | 141/286 |

* cited by examiner

*Primary Examiner*—Steven O. Douglas
(74) *Attorney, Agent, or Firm*—Jenner & Block, LLC

(57) ABSTRACT

A deflector assembly located within the interior of a trailer for distributing dry bulk during loading of the dry bulk into the interior of the trailer. The deflector assembly comprises a deflector and an air cylinder. The deflector has a deflecting surface capable of deflecting the dry bulk being loaded into the interior of the trailer. The deflector moves from an opened position to a deflecting position upon a flow of compressed air from an air source to the air cylinder.

19 Claims, 13 Drawing Sheets

LOAD DISTRIBUTION DEFLECTOR

This application is a continuation-in-part of application Ser. No. 09/821,594 filed on Mar. 29, 2001, now U.S. Pat. No. 6,408,900.

BACKGROUND OF THE INVENTION

The present invention relates to load distribution deflectors. More specifically, it relates to a load distribution deflector for use during loading of dry bulk into a trailer to provide for approximately equal load distribution within the trailer.

In the trucking business, there is a need to improve the means for distributing dry bulk in a trailer during the loading process so that load limits are not exceeded. Dry bulk is normally loaded into a trailer by vacuuming the air from the interior of the trailer. The vacuum created in the interior of the trailer then sucks the dry bulk through a loading line extending through the rear of the trailer. Such method of loading dry bulk allows the trailer to be quickly filled. However, since the dry bulk are loaded into the trailer through a loading line directed toward the front of the trailer, often after the trailer is fully loaded, more of the dry bulk is located at the front of the trailer causing unequal front to rear load distribution. Such unequal load distribution may cause uneven tire wear or more importantly violate the weight limit. To remedy this unequal load distribution, the dry bulk can be redistributed by unloading a portion of the loaded bulk located at the front of the trailer and then reloading the dry bulk at a lower amount of vacuum. Such method of redistributing the load requires significant amount of time and labor. Alternatively, the driver would often drive the tractor and trailer backwards and then slam on the brakes to quickly decelerate tractor and trailer. This quick deceleration would shift the dry bulk toward the rear of the trailer. While such a maneuver is capable of redistributing the dry bulk, it also causes premature wear to the tractor and trailer.

Therefore, there exists a need in the trucking industry to equally distribute the dry bulk in the trailer during the loading process.

SUMMARY OF THE INVENTION

This invention relates to a deflector assembly located within the interior of a trailer for distributing dry bulk during loading of the dry bulk into the interior of the trailer. The deflector assembly comprises a deflector and an air cylinder. The deflector has a deflecting surface capable of deflecting the dry bulk being loaded into the interior of the trailer. The deflector moves from an opened position to a deflecting position upon a flow of compressed air from an air source to the air cylinder.

DETAILED DESCRIPTION OF THE EMBODIMENTS

Figure 1:
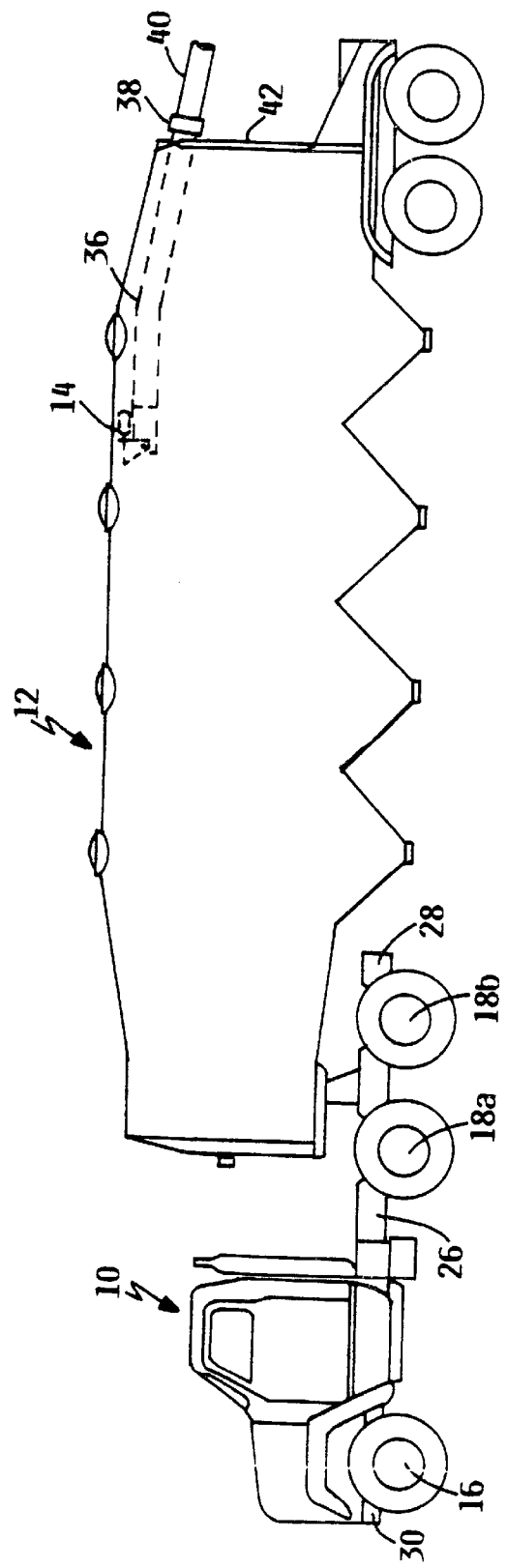
FIG. 1 is a side view of a tractor and trailer having a load distribution deflector of the present invention.
Figure 2:
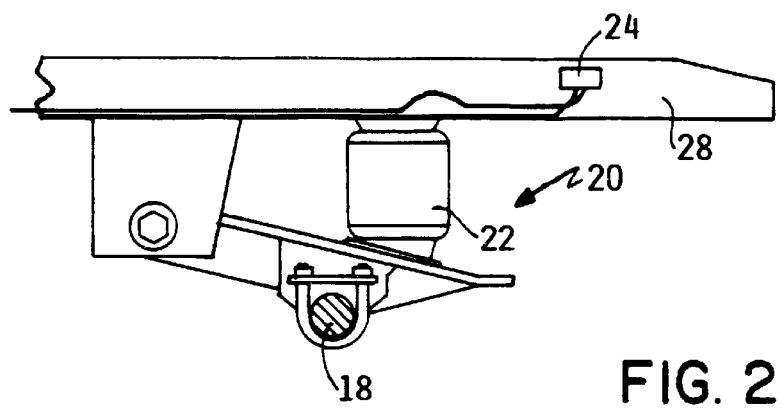
FIG. 2 is a side view of an air suspension having a leveling valve and a set of air bags to control the height of the tractor.

FIG. 1 illustrates a tractor 10 and a trailer 12 incorporating a load distribution deflector assembly 14 in accordance to the present invention. The tractor 10 has a front axle 16 and two rear axles 18a and 18b. As illustrated in FIG. 2, the tractor 10 uses an air suspension 20 comprising a set of four air bags 22 mounted to each rear axle 18 to control the rear height of the tractor 10 and allow the tractor 10 to remain approximately level. A leveling valve 24 is normally used to supply air into the air bags 22 or exhaust air from the air bags 22. The use of air suspension and leveling valve to control the height of the tractor is well known in the art.

Since the trailer 12 is attached the rear of the tractor 10, loading dry bulk into the trailer 12 will add weight the rear of the tractor 10 and removing dry bulk from the trailer 12 will remove weight from the rear of the tractor 10. Furthermore, dry bulk loaded near the front of the trailer 12 will add more weight at the rear of the tractor 10 than dry bulk loaded near the rear of the trailer 12.

As weight is added to the rear of the tractor 10, without an air suspension as disclosed, the rear suspension of the tractor 10 will tend to compress thus lowering the rear portion 28 of the frame 26 relative to the front portion 30 of the frame 26. To keep the frame 26 of the tractor 10 approximately equal, the leveling valve 24 operates to supply pressurized air into the air bags 22 to increase the pressure within the air bags 22 and raise the rear portion 28 of the frame 26 to a height approximately equal to the height of the front portion 30 of the frame 26. Likewise, as weight is removed from the rear of the tractor 10, without an air suspension as disclosed, the rear suspension of the tractor 10 will tend to extend thus raising the rear portion 28 of the frame 26 relative to the front portion 30 of the frame 26. To keep the frame 26 of the tractor 10 approximately equal, the leveling valve 24 operates to discharge pressurized air from the air bag 22 to decrease the pressure within the air bags 22 and lower the rear portion 28 of the frame 26 to a height approximately equal to the height of the front portion 30 of the frame 26.

Since the pressure within the air bag is directly related to the weight positioned over the rear of the tractor 12, an approximation of the weight at the front of the trailer 12 can be determined by the pressure within the air bags 20. With the total weight of the dry bulk loaded into the trailer 12 normally known, the amount of weight at the front of the trailer 10 can be used to determine the weight distribution of the dry bulk within the tractor 10. Therefore, the pressure within the air bags 22, along with the weight of the dry bulk loaded into the trailer 12, can be used to determine the weight distribution of the dry bulk within the trailer 12.

Figure 5:
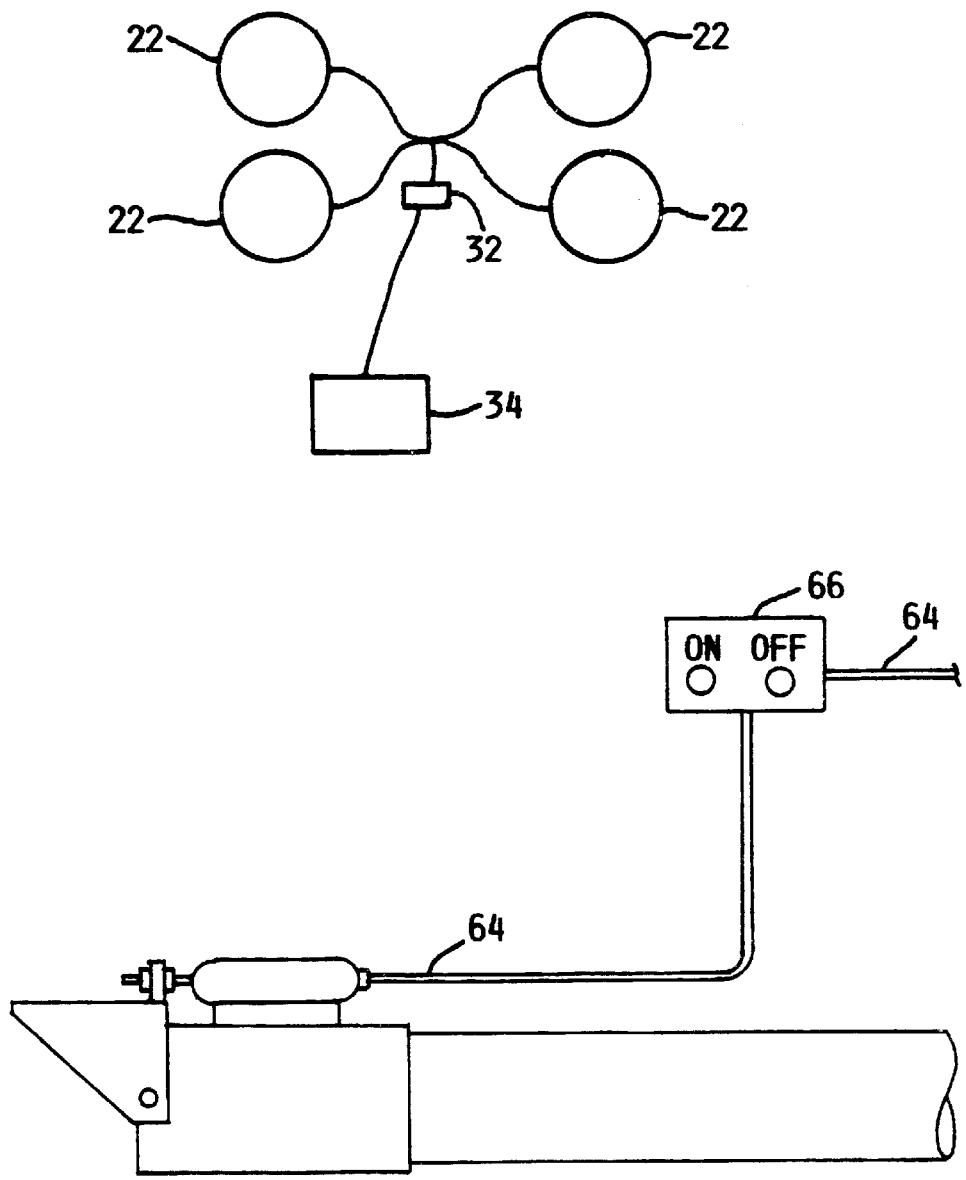
FIG. 5 is a schematic of the mechanism for operating the load distribution deflector of FIG. 1.

FIG. 5 illustrates a schematic of the mechanism for operating the load distribution deflector of the first embodiment of the present invention. A pressure gage or pressure sensor 32 is tapped to a line attached to the air bags 22 of the air suspension 20 to sense the pressure within the air bags 22. A display unit 34 can be attached to the pressure sensor 32 to provide an operator with the pressure within the air bags 22.

It should be noted while this embodiment mainly discloses measuring the pressure within the air bags of the air suspension as the method to determine the weight distribution of the dry bulk within the trailer, other methods to determine the weight distribution of the dry bulk within the trailer may also used in conjunction with the deflector assembly of the present invention. Such other methods to determine the weight distribution of the dry bulk within the trailer include measuring the weight of the front and/or rear of the trailer and measuring the height of the dry bulk at the front and/or rear of the trailer. Therefore, for the purpose of this application, the method for determining the weight distribution of the dry bulk within the trailer can be conducted by measuring the pressure within the air bags of the air suspension or any other method to determine the weight distribution of the dry bulk within the trailer.

As illustrated in FIG. 1, a loading line 36 is used to load the dry bulk into the interior of the trailer 12. The loading line has a coupling 38 at one end of the loading line allowing a supply line 40 to be attached to the loading line. The loading line 36 extends through the rear wall 42 of trailer 12 such that the majority of the loading line 36 is located within the trailer 12 and the coupling 38 is located outside of the trailer 12. The process for loading the dry bulk into the interior of the trailer 12 is to first attach the supply line 40 to the loading line 36. The air within the trailer 12 is then vacuumed from the interior of the trailer 12. The lowered pressure within the trailer creates a suction at the outlet opening of the loading line 36. The dry bulk is then exhausted out of the end of the loading line 36 toward the front of the trailer 12. To deflect the dry bulk exhausted out of the end of the loading line 36, the load distribution deflector assembly 14 is attached to the end of the loading line.

Figure 3:
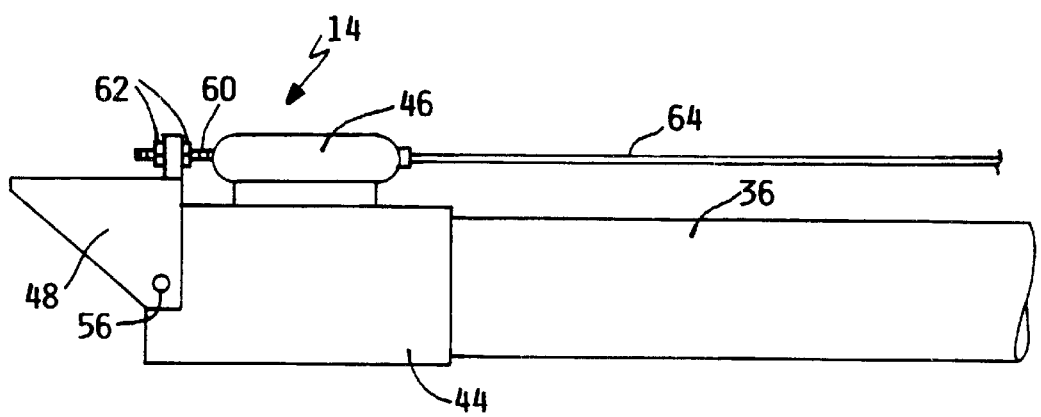
FIG. 3 is an enlarged side view of the load distribution deflector assembly of FIG. 1.
Figure 4:
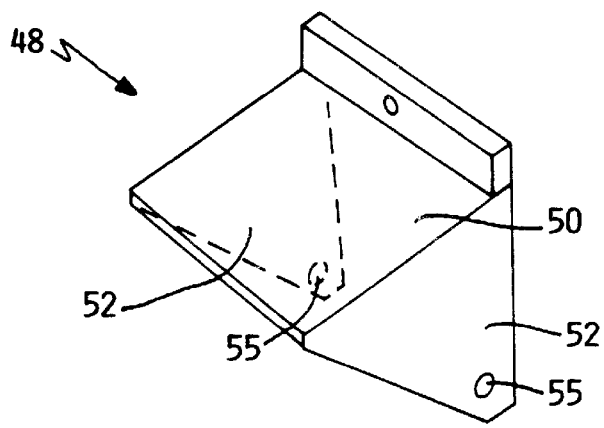
FIG. 4 is a perspective view of the deflector of FIG. 3.

As illustrated in detail in FIG. 3, the load distribution deflector assembly 14 includes a sleeve 44, a deflector positioning mechanism 46 and a defector 48. The use of a sleeve allows the entire deflector assembly 14 to be retrofitted to the end of an existing loading line 36. The inner diameter of the sleeve 44 is approximately equal to the outer diameter of the loading line 36. Such an arrangement allows the sleeve 44 to be slidably mounted to the end of the loading line 36. After the sleeve 44 is slidably mounted to the desired position on the loading line 36, the sleeve 44 is fixed to the loading line 36 through the means of an attachment means. The attachment means can be screws, rivets, nuts and bolts, clamps or any other applicable attachment means. The deflector 48 is pivotably mounted to the end of the sleeve 44. As illustrated in FIG. 4, the deflector 48 has a flat deflecting surface 50. A pair of triangular shaped legs 52 extends from the deflecting surface 50 in one direction. A rectangular shaped bracket 54 extends from the deflecting surface 50 in the other direction. Each leg 52 has a pivot hole defined near the terminal end of the leg. Corresponding pivot holes are defined near the terminal end of the sleeve. A pivot pin 56 is inserted through each of the leg pivot hole and the corresponding sleeve pivot hole allowing the deflector 48 to pivot at the end of the sleeve 44. The location of the sleeve pivot holes are such that the distance between the axis defined by the sleeve pivot holes to the end of the top surface of the sleeve is less than the perpendicular distance between axis defined by the leg pivot holes to the deflecting surface. Such a location of the sleeve pivot holes provides for sufficient clearance between the deflector 48 and the sleeve 44 to allow the deflector to pivot from an opened position to a deflecting position. At the opened position of the deflector 48, the deflecting surface 50 is approximately parallel to the axis of the sleeve 44.

For the purpose of this application, the opened position of the deflector 48 is defined as the position where the deflector 48 allows the dry bulk to be exhausted from the loading line 36 without contacting the deflecting surface 50. At the deflecting position of the deflector 48, the deflector 48 is at a position where at least a portion of the deflecting surface 50 is situated in front of the sleeve opening. For the purpose of this application, the deflecting position of the deflector 48 is defined as the position where the deflector 48 allows the dry bulk exhausted from the loading line 36 to contact the deflecting surface 50 causing the dry bulk to be redirected.

The deflector positioning mechanism 46 of the first embodiment is an air cylinder 46 situated on a based 58 attached to the top of the sleeve 44. The air cylinder 46 has a rod 60 extending from one end of the air cylinder. The rod 60 is approximate parallel with the axis of the sleeve 44 and is insertable through a hole defined in the bracket 54 of the deflector 48. The rod 60 is threaded at the end for a given length. Two nuts 62 are threaded onto the threaded portion of the rod 60 such that upon the rod inserted through the bracket hole, the nuts 62 are positioned on each sides of the bracket 54. Each nut 62 defines an abutment surface directed toward the bracket 54. Such an arrangement allows the bracket 54 of the deflector 48 to be adjustable axially along the rod 60 of the air cylinder 46. Alternatively, other fasteners such as cotter keys or spring pins may be used in place of the nuts 62 to retain the bracket 54 at a certain position along the rod 60.

Internally (not shown), the air cylinder 48 has a disk attached to the other end of the rod 60. The disk separates the internal cavity of the air cylinder into a pressurized chamber and a non-pressurized chamber. A coil spring is located in the non-pressurized chamber biasing the rod toward the pressurized chamber. The air cylinder 48 is attached to an air line 64 which supplies pressurized air to the pressurized chamber. Once pressured air is supplied to the pressurized compartment, the pressure counters the bias by the coil spring and extends the rod 60 axially outwardly. The axially outwardly extension of the rod 60 pivotably rotate the deflector 48 toward the deflecting position. Once pressurized air is bleed out of the pressurized chamber, the coil spring biases the rod 60 axially inwardly. The axially inwardly retraction of the rod 60 pivotably rotate the deflector toward the opened position. The air line 64 can be attached to any pressurized air source available from the tractor 10. Such pressurized air source may be the same source supplying pressurized air to the air suspension 20 of the tractor 10. Located mid-line of the air line 64 is an air switch 66. The air switch 66 has an on position and an off position. When the air switch 66 is switched to the on position, pressurized air is allowed to flow to the pressurized chamber of the air cylinder 46. When the air switch 66 is switched to the off position, pressurized air is prevented from flowing to the pressurized chamber of the air cylinder 46 and the pressurized air is bleed out of the air cylinder 46.

The first embodiment functions as follows. The operator connects the supply line 40 to the loading line 36 and starts the vacuuming process to remove the air within the trailer. The vacuuming process activates the flow of dry bulk within the loading line 36 and the supply line 40. The dry bulk flows through the supply line 40, into the loading line 36 and is exhausted out of the end of the loading line 36. With the deflector 48 at the opened position, the dry bulk is discharged from the loading line 36 toward the front of the trailer 12. While the dry bulk is discharge out of the end of the loading line 36, the operator monitors the display unit 34 of the pressure sensor 32 for the pressure within the air bags 22 of the air suspension 20. Once the pressure sensor 32 indicates the pressure within the air bags 22 has reached a predetermine value, the operator would then switch the air switch 66 from the off position to the on position to activate the air cylinder 46 to rotate the deflector 48 from the opened position to the deflecting position. The preferred predetermined value is the pressure of the air bags 22 at which when the deflector 48 is rotated from the opened position to the deflecting position, the weight of the fully loaded dry bulk at the front of the trailer 12 will be approximately equally to the weight of the fully loaded dry bulk at the rear of the trailer 12. Therefore, the preferred predetermined value is a value less than the pressure within the air bags 22 when the trailer 12 is fully loaded with weight of the dry bulk at the front of the trailer approximately equal to the weight of the dry bulk at the rear of the trailer.

Another method to load the dry bulk is for the operator to start loading the trailer 12 with the deflector 48 in the defecting position. Once the display unit 34 of the pressure sensor 32 indicates that the pressure within the air bags 22 has reached a predetermine value, the operator would then switch the air switch 66 from the on position to the off position to activate the air cylinder 46 to rotate the deflector 48 from the deflecting position to the opened position. For this method, the preferred predetermined value is the pressure of the air bags 22 at which when the deflector 48 is rotated from the deflecting position to the opened position, the weight of the fully loaded dry bulk at the front of the trailer 12 will be approximately equally to the weight of the fully loaded dry bulk at the rear of the trailer 12.

Figure 6:
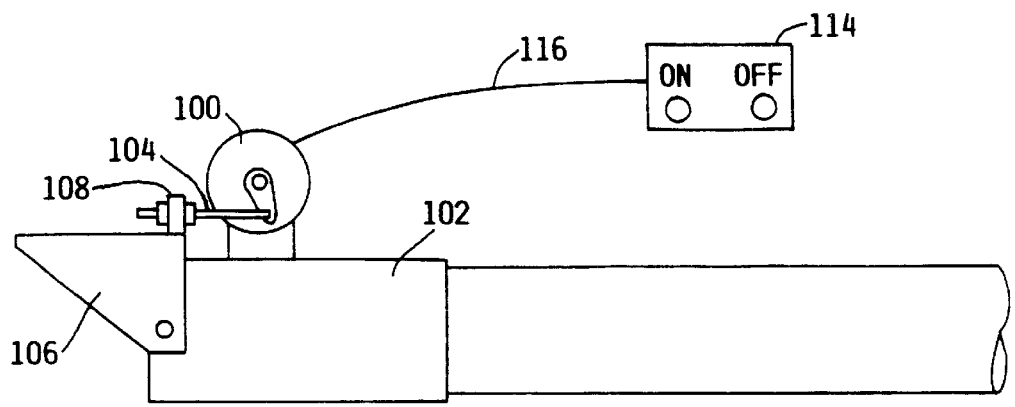
FIG. 6 is a side view of a load distribution deflector assembly including an electric motor mounted the top of the sleeve.
Figure 7:
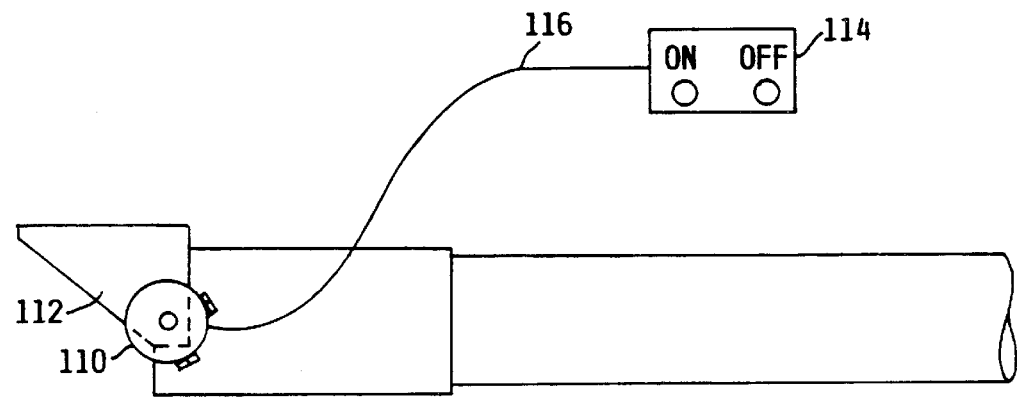
FIG. 7 is a side view of a load distribution deflector assembly including an electric motor mounted near the pivot point of the deflector.

A second embodiment of a deflector assembly is similar to the deflector assembly of the first embodiment with the exception of the deflector positioning mechanism being an electric motor rather an air cylinder and the use of an electric switch rather than an air switch to activate the deflector positioning mechanism. As illustrated in FIG. 6, the electric motor 100 can be mounted on the top of the sleeve 102. A rod 104 is connected to the electric motor 100 at one end of the rod and the bracket 108 of the deflector 106 is connected to the other end of the rod. Any inwardly and outwardly axial movement of the rod 104 would rotate the deflector 106 from the opened position to the deflecting position and vice versa. Alternatively, as illustrated in FIG. 7, the electric motor 110 can be mounted near the pivot point of the deflector 112 and is able to directly rotate the deflector 112 from the opened position to the deflecting position and vice versa.

Figure 8:
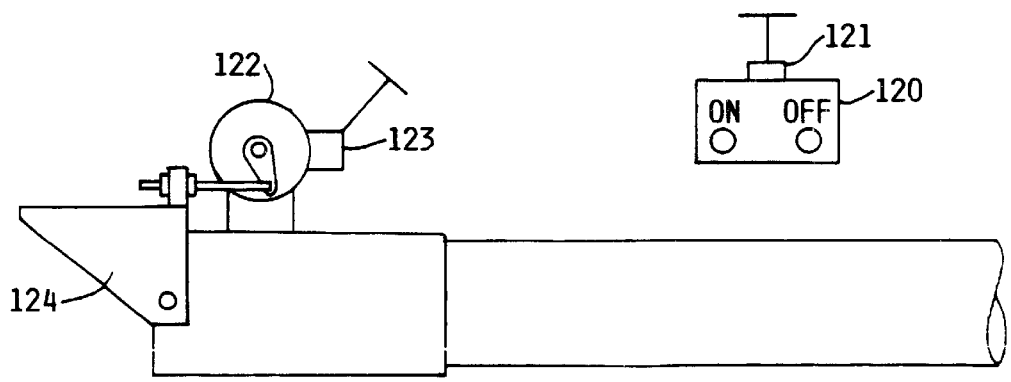
FIG. 8 is a side view of a load distribution deflector assembly including an electric switch having a radio transmitter and an electric motor having radio receiver.

An electric switch 114 can be electrically connected to the electric motor 100/110 by a wire 116 connecting the electric switch 114 to the electric motor 100/110. The electric switch 114 is able to send a signal through the wire 116 to the electric motor 100/110 to rotate the deflector 112 from the opened position to the deflecting position and another signal to rotate the deflector 112 from the deflecting position to the opened position. Rather than connecting the electric switch to electric motor with a wire, the electric switch 120 can also have a radio transmitter 121 as illustrated in FIG. 8. The electric switch 120 having the radio transmitter 121 is able to send a wireless signal to the electric motor 122 having a radio receiver 123 to rotate the deflector 124 from the opened position to the deflecting position and another wireless signal to rotate the deflector 124 from the deflecting position to the opened position. The electric motor 122 can be mounted on top of the sleeve as illustrated in FIG. 6 or mounted near the pivot point of the deflector as illustrated in FIG. 7.

Figure 9:
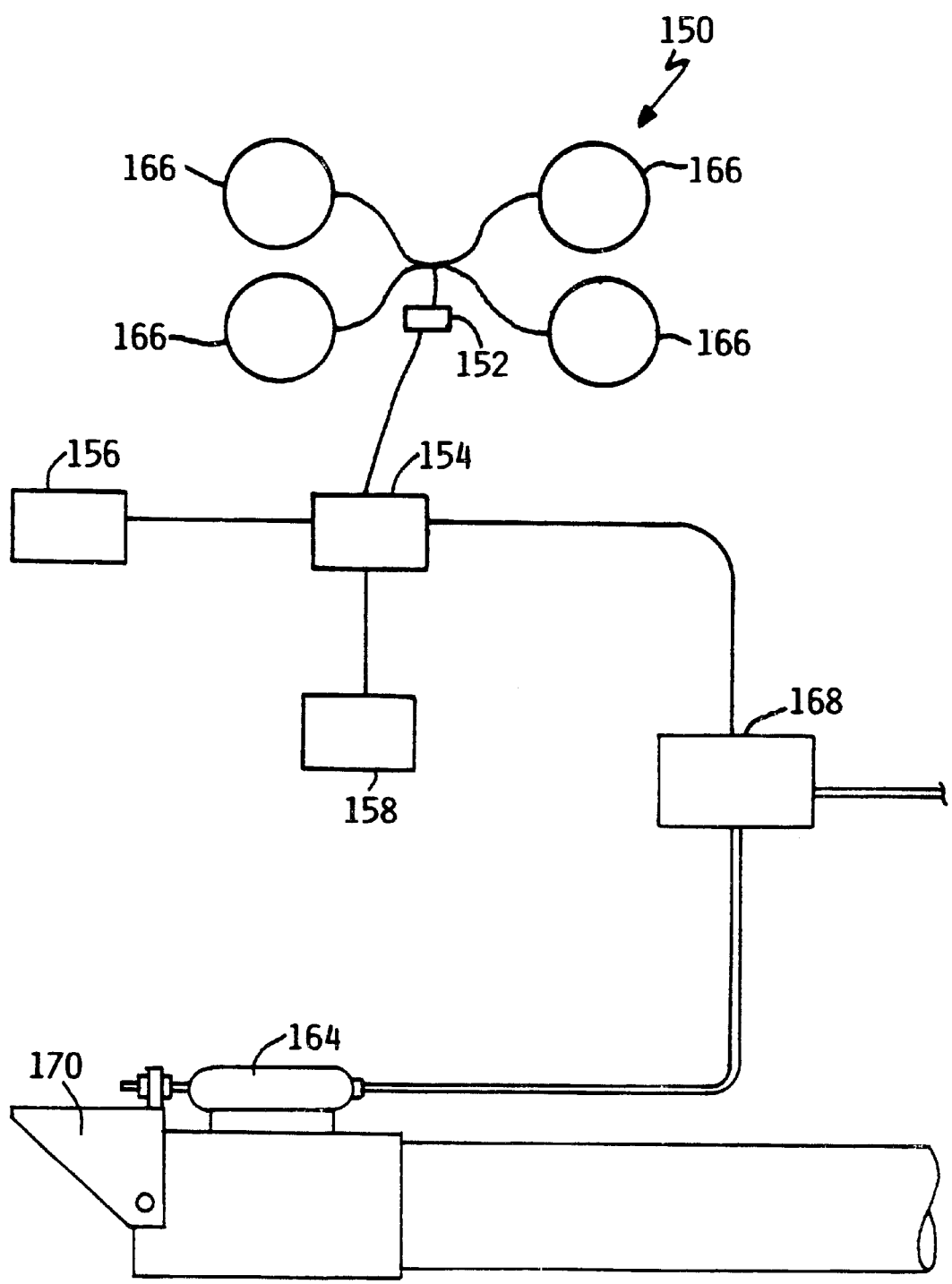
FIG. 9 is a schematic of an automated mechanism for operating a load distribution deflector in accordance to a third embodiment of the present invention.

A third embodiment of a deflector assembly is similar to the deflector assembly of the first embodiment with the exception that the deflector automatically switches from one position to the other position once the pressure within the air bags has reached a predetermined value. A schematic of the automated mechanism for operating a load distribution deflector is illustrated in FIG. 9. The third embodiment of a deflector assembly system 150 includes a pressure sensor 152, a microprocessor based controller 154, an input unit 156, a display unit 158 and a deflector assembly 160 having a deflector 162 and a deflector positioning mechanism 164.

Similar to first embodiment, the pressure sensor 152 is tapped to a line attached to the air bags 166 of the air suspension to sense the pressure within the air bags 166. However, rather than simply displaying the pressure within the air bags on a display unit, the pressure sensor 152 sends as a signal to the controller 154 providing the controller with the pressure within the air bags 166. The controller 154 compares the pressure within the air bags 166 with a predetermined value inputted into the controller 154. The predetermined value can be inputted into the controller by an operator selecting the desired predetermined value on the input unit 156 or inputting the predetermined value into the input unit 156. As with the first embodiment, the preferred predetermined value is the pressure of the air bags 166 at which when the deflector 162 is rotated from the opened position to the deflecting position, the weight of the fully loaded dry bulk at the front of the trailer will be approximately equally to the weight of the fully loaded dry bulk at the rear of the trailer. After the controller 154 determines that the pressure within the air bags 166 exceeds the predetermined value, the controller 154 sends a signal to a switch 168 to activate the deflector positioning mechanism 164 of the deflector assembly to rotate the deflector 170 from the opened position to the deflecting position. The deflector positioning mechanism 164 can be an air cylinder as disclosed in the first embodiment or an electric motor as disclosed in the second embodiment.

Should an air cylinder be used, similar to the first embodiment, the air source for activating the air cylinder can be any pressurized air source available from the tractor. Such pressured air source may be the same source supplying pressurized air to the air bags 166 of the air suspension of the tractor. When the controller 154 sends a signal to the switch 168 to activate the air cylinder, the air source from the tractor flows through the switch 168 and to the air cylinder.

The third embodiment has the ability to automatically rotate the deflector 162 from the opened position to the deflecting position once the pressure within the air bags 166 exceeds the predetermined value without requiring an operator to monitor the air pressure within the air bags 166 and activate a switch. This reduces the labor required to monitor the air pressure within the air bags and reduces human error which may occur by the operator activating the deflector position mechanism prior to or well after the pressure within the air bags has reached the predetermined value.

Figure 10A:
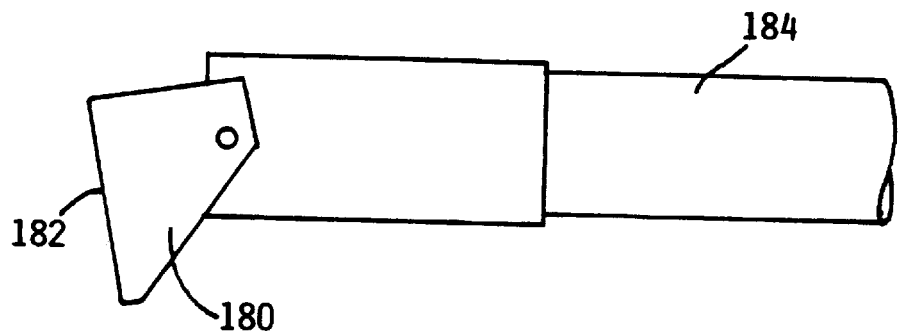
FIG. 10A is a side view of a load distribution deflector assembly, in accordance to a fourth embodiment, without dry bulk exhausted out of the loading line.
Figure 10B:
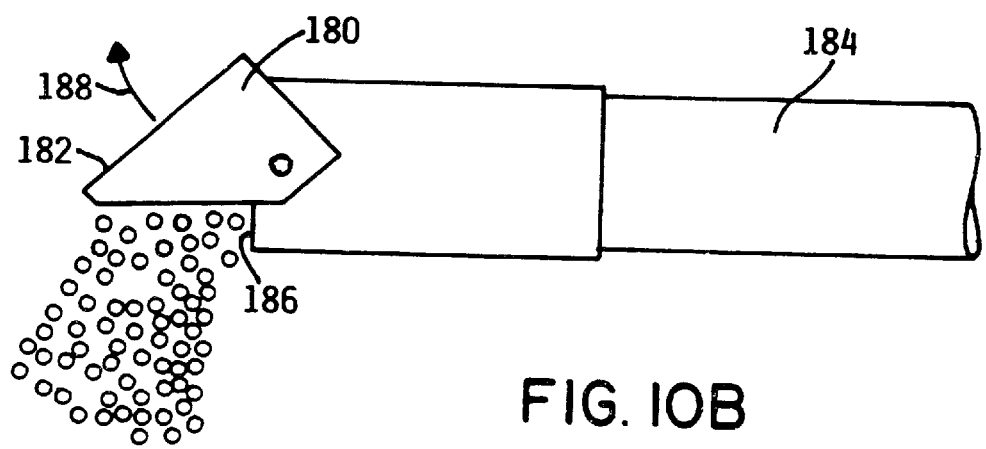
FIG. 10B is a side view of the load distribution deflector assembly of FIG. 10A with dry bulk exhausted out of the loading line.

A fourth embodiment of a deflector assembly is similar to the deflector assembly of the first embodiment with the exception that the deflector is capable of distributing the dry bulk exhausted out of the loading line without the use of a deflector positioning mechanism. Due to the weight of a deflector 180, without a deflector positioning mechanism or other stop mechanisms, the deflector 180 would normally be situated in a closed position, as illustrated in FIG. 10A, in which the deflecting surface 182 would at least partially block the outlet opening 186 of the loading line 184. As illustrated in FIG. 10B, once the dry bulk is blown through the loading line 184, the dry bulk exhausted out of the outlet opening 186 will hit the deflecting surface 182 of the deflector 180 and rotate the deflector 180 toward the opened position in the direction of arrow 188. The greater the deflector 180 rotates toward the opened position, the more of the exhausted dry bulk will be distributed toward the front of the trailer. The deflector is calibrated to rotate to a position wherein the weight of the fully loaded dry bulk at the front of the trailer will be approximately equally to the weight of the fully loaded dry bulk at the rear of the trailer. The deflector can be calibrated by adding/removing weight to the deflector, adjusting a stop for preventing further rotation of the deflector or adjusting a spring which biases the deflector toward the closed position.

Furthermore, the deflector 180 of the fourth embodiment can also be fixed to a deflecting position. The deflecting position would be fixed to a deflecting position wherein the weight of the fully loaded dry bulk at the front of the trailer will be approximately equally to the weight of the fully loaded dry bulk at the rear of the trailer.

Figure 11:
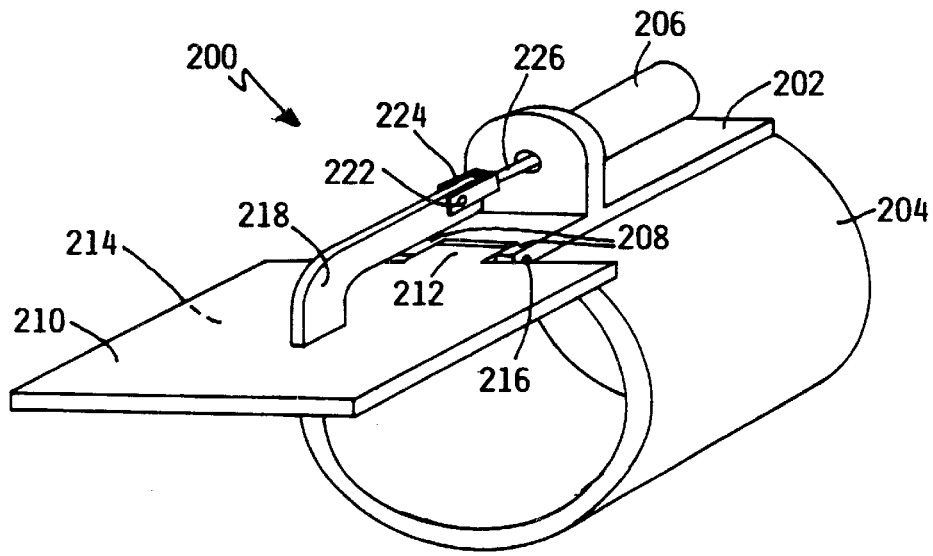
FIG. 11 is a perspective view of a load distribution deflector assembly, in accordance to a fifth embodiment.
Figure 12:
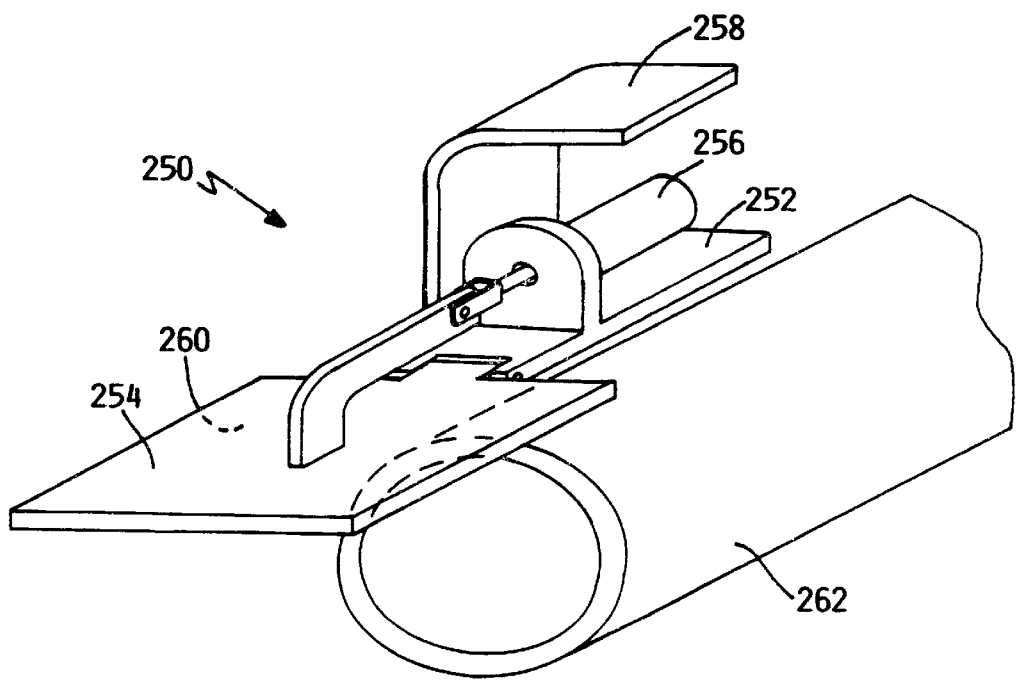
FIG. 12 is a perspective view of a load distribution deflector assembly, in accordance to a sixth embodiment.

A fifth embodiment of a deflector assembly 200 is similar to the deflector assembly 14 of the first embodiment with the exception that the defector is pivotable mounted to a plate attached to the top of the sleeve. As illustrated in FIG. 11, a plate 202 is mounted on the top of a sleeve 204. A deflector positioning mechanism 206 is attached to the plate 202. The deflector positioning mechanism 206 may be an air cylinder or an electric motor. Two legs 208 extend from one end of the plate 202. The legs 208 are located at the sides of the plate and extend beyond the terminal end of the sleeve 204. The legs 208 define a notch between the legs 208. Each leg 208 has a pivot hole defined therein. A deflector 210 is pivotably mounted to the plate 202. The deflector 210 has a mounting extension 212 and a deflecting surface 214. The width of the mounting extension 212 is slightly smaller than the notch defined between the legs 208 allowing the mounting extension to fit within the notch. A pivot hole is defined in the mounting extension 212. The deflector 210 is mounted to the plate 202 by a pin 216 inserted through the pivot holes of the legs 208 of the plate 202 and through the pivot hole of the mounting extension 212 of the deflector 210.

A bracket 218 extends from the deflector 210 on the surface opposite the deflecting surface 214. The bracket 218 extends toward the mounting extension 212. The bracket 218 defines a pivot hole at the end of the bracket. A pin 222 is inserted through a clip 224 attached to the end of the rod 226 of the deflector positioning mechanism 206 and through the pivot hole of the bracket 218. Since the deflector 210 is pivotably mounted to the plate 202, any axial movement of the rod 226 will cause the deflector 210 to pivot relative to the plate 202 and likewise to pivot relative to the sleeve 204 and the loading line to which the plate 202 is attached.

A sixth embodiment of a deflector assembly 250 is similar to the deflector assembly 200 of the fifth embodiment with the exception that the deflector assembly is attached to the interior surface of the trailer rather than attached to the loading line. The deflector assembly 250 has a plate 252, a deflector 254 and a deflector positioning mechanism 256. The deflector 254 and the deflector positioning mechanism 256 of the sixth embodiment are identical to the deflector 210 and the deflector assembly mechanism 206 of the fifth embodiment. The plate 252 of the sixth embodiment is similar to the plate 202 of the fifth embodiment but includes an upper mounting wall 258 for mounting the deflector assembly 250 to the interior surface of the trailer. The deflector assembly 250 is located in the trailer such that the deflecting surface 260 of the deflector 254 is capable of deflecting the dry bulk exhausted out of the loading line 262 when the deflector 254 is at the deflecting position.

Figure 13:
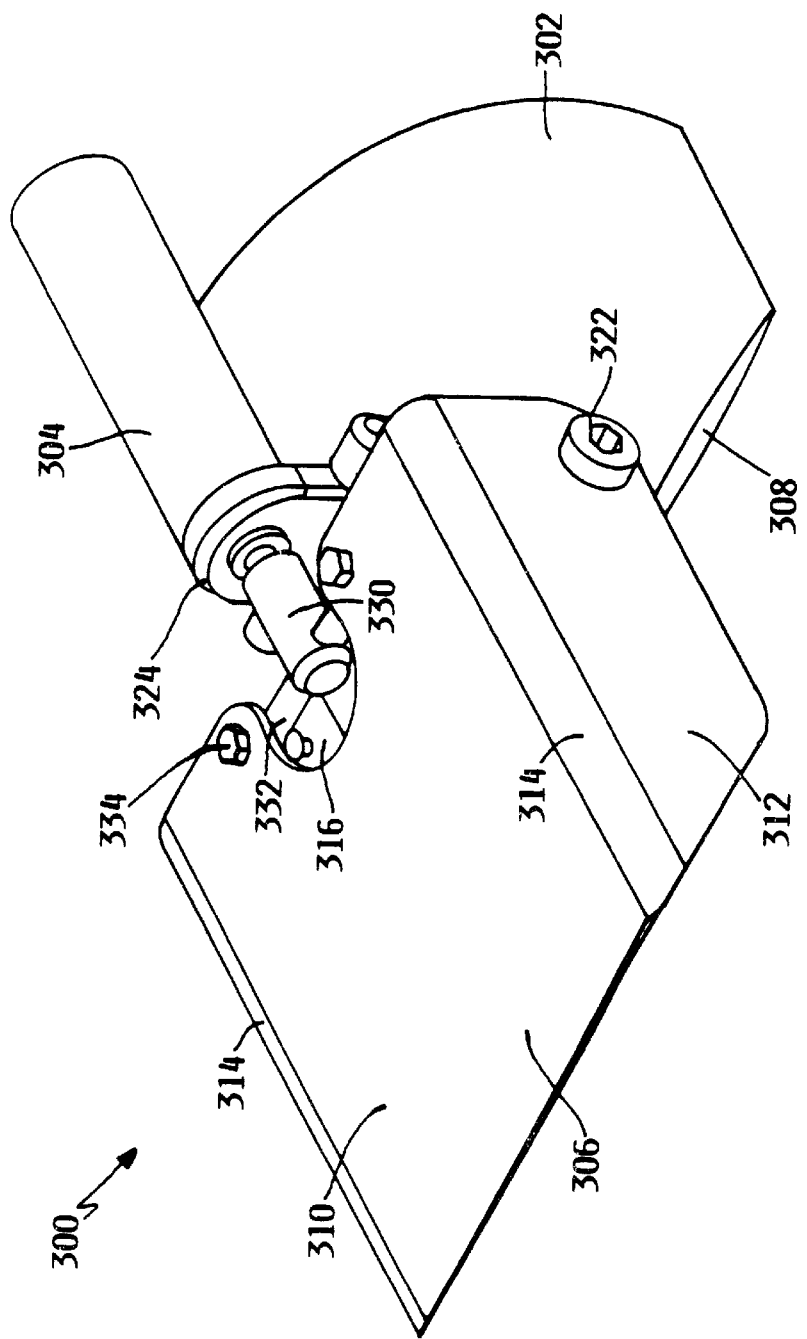
FIG. 13 is a perspective view of a load distribution deflector assembly, in accordance to a seventh embodiment.
Figure 15:
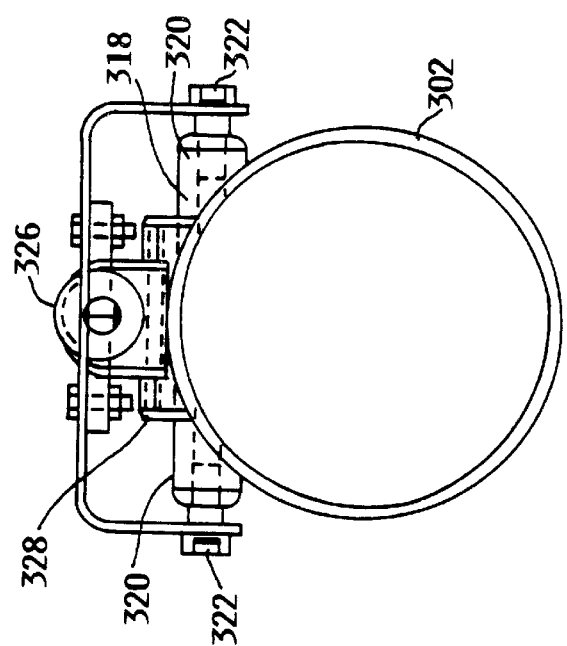
FIG. 15 is a front view of the load distribution deflector assembly of FIG. 13.
Figure 14:
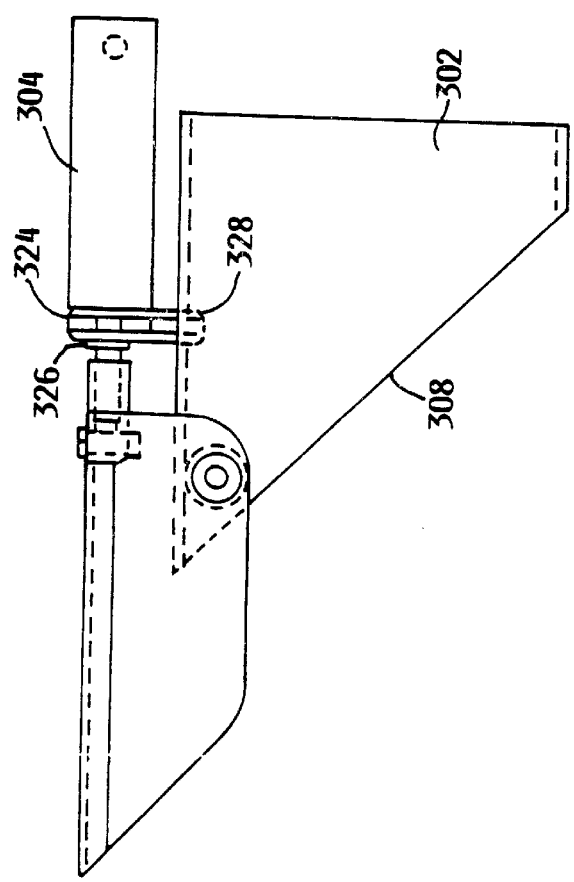
FIG. 14 is a side view of the load distribution deflector assembly of FIG. 13.

A seventh embodiment of a load distribution deflector assembly is illustrated in FIGS. 13–15. The deflector assembly 300 comprises a sleeve 302, a deflector positioning mechanism 304 and a deflector 306. The sleeve 302 of the seventh embodiment has an opening 308 angled downwardly. This allows the deflector 306 to be more effective in directing the dry bulk, exhausted out of the loading line, downwardly toward the bottom of the trailer.

The deflector 306 has a flat deflecting surface 310 and a pair of legs 312 extending from the deflecting surface 310 in one direction. Located at the end of each leg 312 is a leg pivot hole. A rounded portion 314 is located between the junction of the flat deflecting surface 310 and each leg 312. The rounded portion 314 prevents the exhausted dry bulk from being lodged between the flat deflecting surface 310 and the legs 312. The deflecting surface 310 has a notch 316 defined at one end of the deflecting surface 310. Two mounting holes are defined at the sides of the notch 316.

A deflector mounting bracket 318 is attached to the end of the sleeve. The deflector mounting bracket 318 has two annular protrusions 320 extending from both sides. Each annular protrusion 320 has a threaded hole defined therein. Two bolts 322 having threaded ends are used to attach the deflector 306 to the annular protrusions 320 of the deflector mounting bracket 318. Each bolt 322 is inserted through the leg pivot hole of the defector 306 and threaded to the threaded holes defined in the corresponding annular protrusion 320. Such an arrangement allows the deflector 306 to pivot relative to the deflector mounting bracket 318 and to the sleeve 302 to which the deflector mounting bracket is attached.

The deflector positioning mechanism 304 of the seventh embodiment is an air cylinder and is the same as the deflector positioning mechanism 46 of the first embodiment. However, an electric motor can be used in place of the air cylinder. The deflector positioning mechanism 304 is attached to the sleeve 302 by the means of a deflector positioning mechanism mounting bracket 324 mounted to the top of the sleeve. The deflector positioning mechanism mounting bracket 324 has a first section 326 and a second section 328. The deflector positioning mechanism 304 is attached to a hole defined in the first section 326. The second section 328 is attached to the top of the sleeve 302. The first section 326 is pivotably mounted to the second section 328. The pivotable mounting allows the first section 326 to pivot freely when the deflector positioning mechanism 304 extends or retracts. This eliminates the possibility of the rod 330 of the deflector positioning mechanism 304 binding due to the rod not remaining in the same axis when the deflector mechanism 304 extends or retracts.

The rod 330 of the deflector positioning mechanism 304 has a hole defined perpendicular to the axis of the rod 330. A pivot pin 332 having mounting holes defined at the ends of the pin 332 is inserted through the hole defined in the rod. Two bolt and nut combinations 334 are used to secure the deflector 306 to the pivot pin 332.

The load distribution deflector assembly 300 of the seventh embodiment operates essentially the same as the load distribution deflector assembly 14 of the first embodiment. As the rod 330 of the deflector positioning mechanism 304 extends axially outwardly, the rod 330 pushes on the pivot pin 332 causing the deflector 306 to rotate toward the deflecting position. As the rod 330 of the deflector positioning mechanism 304 retracts axially inwardly, the rod 330 pulls on the pivot pin 332 causing the deflector 306 to rotate toward the opened position. The notch 316 defined at the end of the deflecting surface 310 provides the clearance for the end of the rod 330 while the rod 330 extends or retracts. The pivotable mounting between the first section 326 and the second section 328 of the deflector position mechanism mounting bracket 324 allows the rod 330 to extend or retract without requiring the rod 330 to remain at the same axis.

Another feature of the load distribution deflector assembly 300 of the seventh embodiment is that the exterior surfaces of load distribution deflector assembly 300 are or could be move to a position wherein the outer surfaces prevent entrapment of dry bulk. The entrapment prevention surfaces are exhibited by the rounded upper surfaces of the sleeve 302, the deflector positioning mechanism 304 and the deflector positioning mechanism mounting bracket 324. The entrapment prevention surfaces are also exhibited by the vertical legs 312 of the deflector 306, the vertical end of the deflector positioning mechanism 304 and the vertical sides of the deflector positioning mechanism mounting bracket 324. While FIGS. 13–15 illustrate the deflecting surface 310 of the deflector 306 at a horizontal position, the deflector 306 can be rotated toward the deflecting position causing the deflecting surface 306 to be sloped downwardly without any obstructions at its downward most edge thus dislodging any dry bulk that might be trapped on the deflecting surface 306. Therefore, for the purpose of this application, an entrapment prevention surface is defined as a surface which is rounded, vertical or sloped downwardly without any obstructions at its downward most edge or could be moved to such a position.

Figure 16:
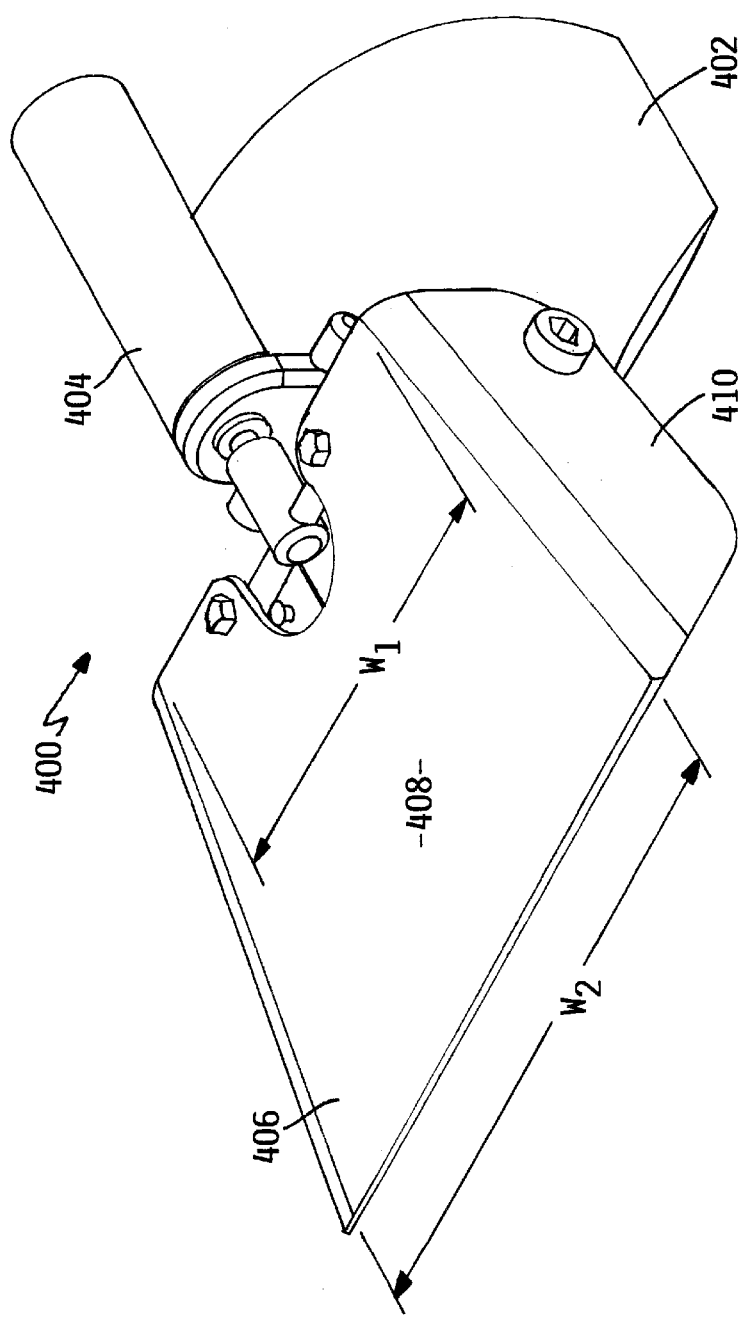
FIG. 16 is a perspective view of a load distribution deflector assembly, in accordance to an eighth embodiment.

An eighth embodiment of a load distribution deflector assembly is illustrated in FIG. 16. The eighth embodiment of a deflector assembly is similar to the deflector assembly of the seventh embodiment with the exception of the deflector flared outwardly to allow for more of the exhausted dry bulk to be directed toward the sides of the trailer, rather than mainly toward the middle of the trailer.

Dry bulk loaded mainly toward the middle, or near the center line, of the trailer could potentially shift to one side of the trailer, thereafter causing uneven right to left load distribution within the trailer. An uneven right to left load distribution within the trailer will cause uneven tire wear and more seriously may also cause a potentially dangerous condition such as a roll over of the trailer and the attached tractor. Therefore, it is not only desirable to have an even front to rear load distribution within the trailer, it is also desirable to have an even right to left load distribution within the trailer. The deflector according the eighth embodiment helps to prevent an uneven right to left load distribution by directing more of the dry bulk toward the sides of the trailer during loading. Such loading of the dry bulk will then reduce shifting of the loaded bulk when the trailer is in motion.

The deflector assembly 400, in accordance to the eighth embodiment, comprises a sleeve 402, a deflector positioning mechanism 404 and a deflector 406. The deflector 406 has a deflecting surface 408 and a pair of legs 410 extending from the deflecting surface 408 in one direction. Located at the end of each leg 410 is a leg pivot hole. The deflecting surface 408 is shaped such that the width $W_1$ of the deflecting surface 408 at the pivot end of the deflector 406 is less than the width $W_2$ at the other end of the deflecting surface 408. The corresponding legs 410 extend from the edges of the deflecting surface 408. Such shape of the deflector 406, in which it flares outwardly from the pivot end, allows more of the dry bulk to be distributed toward the sides of the trailer as compared to a deflector which is not flared outwardly from the pivot end.

While not illustrated in FIG. 16, it may also be desirable for the deflecting surface to have an inwardly extending indentation located at the middle underside of the deflecting surface. Such an inwardly extending indentation would be capable of deflecting the exhausted dry bulk toward the sides of the trailer allowing for a more even distribution of the dry bulk during the loading process.

A ninth embodiment of a deflector assembly is similar to the deflector assembly of the first embodiment with the exception that the air source for activating the air cylinder be the air tank located on the trailer and the air switch located on the trailer is electrically connected to the tractor by attaching a plug to the pigtail of the tractor.

Figure 17:
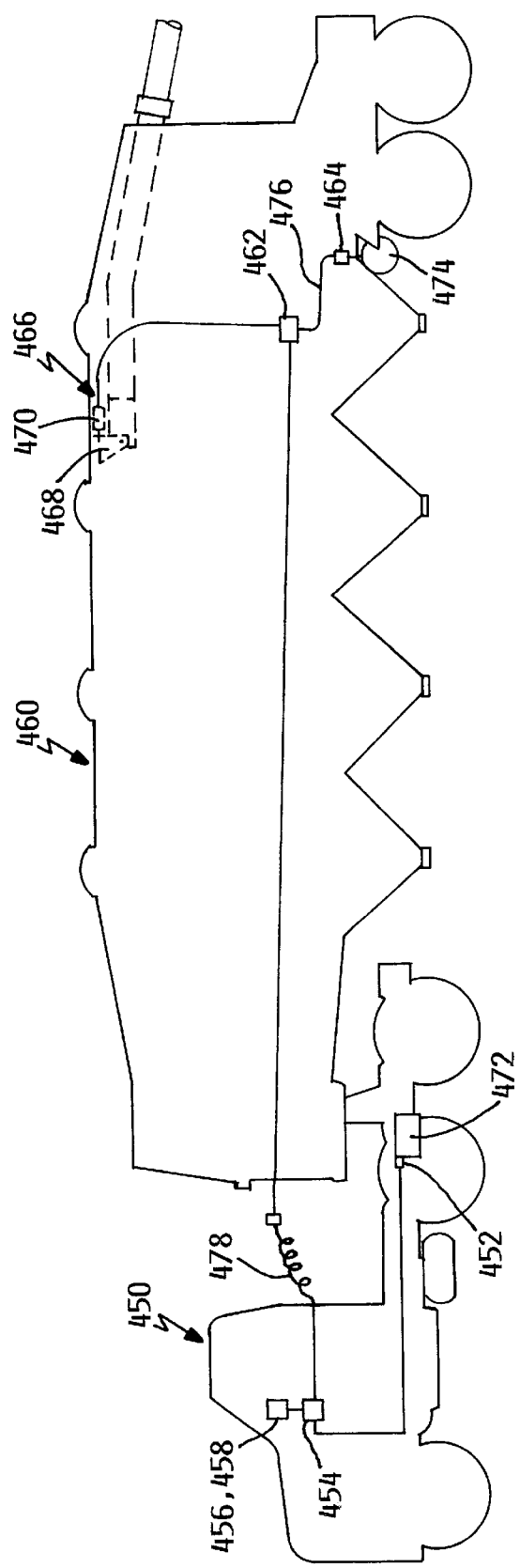
FIG. 17 is a schematic of an automated mechanism for operating a load distribution deflector assembly using the trailer air tank as the air source, in accordance to a ninth embodiment.

A schematic of the automated deflector assembly system for operating the load distribution deflector, in accordance to the ninth embodiment, is illustrated in FIG. 17. The ninth embodiment of a deflector assembly system includes a pressure sensor 452, a microprocessor based controller 454, an input unit 456 and a display unit 458 located on the tractor 450. The deflector assembly system further includes an air switch 462, a shut-off valve 464 and a deflector assembly 466 having a deflector 468 and an air cylinder 470 located on the trailer 460.

The pressure sensor 452 is tapped to a line attached to the air bags 472 of the air suspension to sense the pressure within the air bags 472. The pressure sensor 452 sends a signal to the controller 454 providing the pressure within the air bags 472. The controller 454 compares the pressure within the air bags 472 with a predetermined value inputted into the controller 454. The predetermined valve can be inputted into the controller 454 by an operator selecting the desired predetermined value on the input unit 456 or inputting the predetermined value into the input unit 456. After the controller 454 determines that the pressure within the air bags 472 exceeds the predetermined value, the controller 454 sends a signal to the air switch 462 to activate the air cylinder 470 to rotate the deflector 468 from the opened position to the deflecting position. The air source for activating the air cylinder 470 is the air tank 474 located on the trailer 460. An air tank is often located on the trailer for supplying air to the air breaks of the trailer and other air components on the trailer. The advantage of obtaining the air from the trailer rather than the tractor is that a shorter air line can be used to connect the air source to the air cylinder. This would in turn reduce the cost of the system and the likelihood of air leakage in the system.

Since the air tank 474 often also supplies the air for the air breaks, a sudden loss of air pressure in the air tank 474 could create a dangerous situation. To prevent the air tank 474 from a sudden loss of air pressure due to a leak in the deflector assembly system, it is desirable to insert a shut-off valve 464 in the air line 476 connecting the air tank 474 to the air switch 462. The shut-off valve 464 acts as a flow sensor, automatically shutting off the flow of compressed air when the flow rate exceeds a predetermined closing flow rate. Such shut-off valves are well known in the art and the design of the shut-off valve itself is not the subject of this invention.

The controller 454 of the ninth embodiment is located on the tractor 450 and the air switch 462 is located on trailer 460. Therefore, a means for electrically connecting the controller 454 to the air switch 462 is necessary. A pigtail 478 is normally provided with the tractor to electrically connect the tractor to the trailer to operate the electrical components on the trailer such as the turn signals. The standard operating procedure is to connect the pigtail of the tractor with a mating plug of the trailer once the trailer has been hooked up to the tractor. The existing pigtail 478 would have a number of slots designated for specific use, but would also have at least one undesignated open slot. The controller 454 located on the tractor 450 can be electrically connected to air switch 462 through one of the undesignated open slot of the pigtail 478. Since the pigtail 478 of the tractor 450 needs to be attached to the plug of the trailer 460 regardless of the existence of the deflector assembly system, no additional step is necessary for the operator to electrically connect the components of the deflector assembly system located on the tractor 450 with the components of the deflector assembly system located on the trailer 460.

A tenth embodiment of a deflector assembly is similar to the deflector assembly of the ninth embodiment with the exception that air source for activating the air cylinder can be from either the air tank located on the tractor or the air tank located on the trailer.

Figure 18:
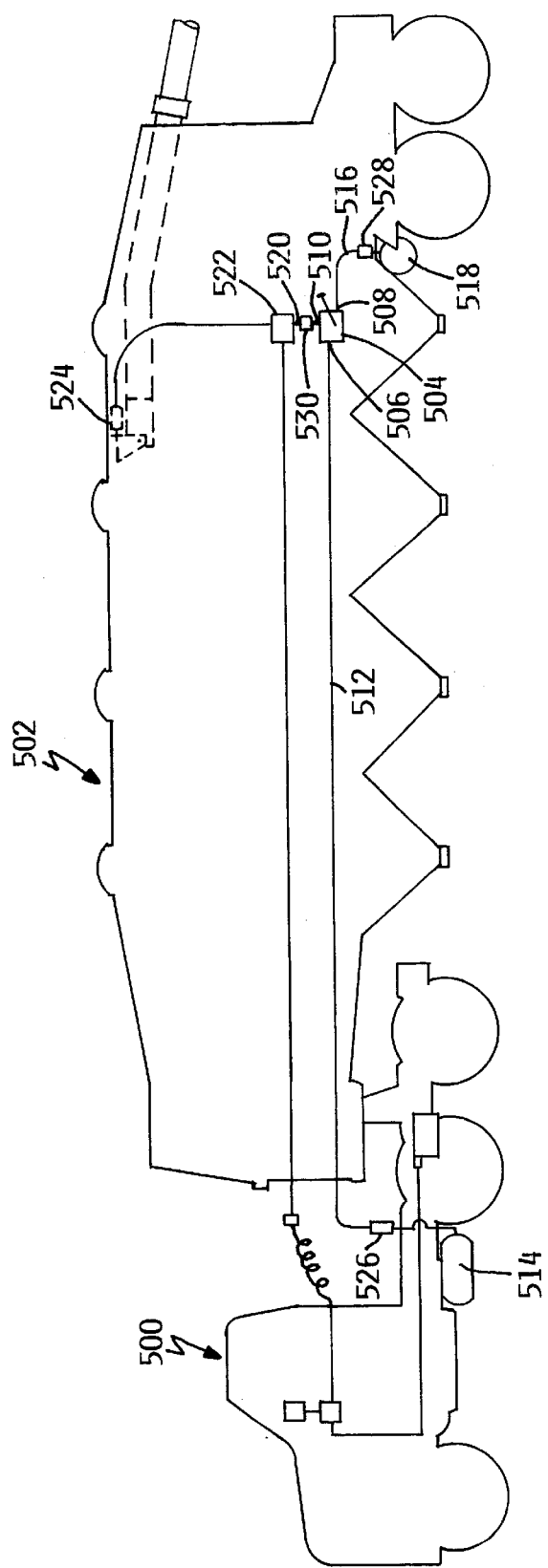
FIG. 18 is a schematic of an automated mechanism for operating a load distribution deflector assembly having a manual switch for selecting the air source, in accordance to a tenth embodiment.

Situations may exist in which it would be desirable to be able to select which air tank is used to activate the air cylinder. Example of such a situation is one of the air tank being used to operate another air powered mechanism. It would then be desirable to use the other air tank to activate the air cylinder. As illustrated in FIG. 18, a manual air switch 504 is provided to allow the operator to select which air tank to use for activating the air cylinder. The manual air switch 504 has two inlet fittings 506, 508 and one outlet fitting 510. One inlet fitting 506 is attached to a hose 512 connected to the tractor air tank 514 located on the tractor 500. The other inlet fitting 508 is attached to a hose 516 connected to the trailer air tank 518 located on the trailer 502. The outlet fitting 510 of the manual air switch 504 is attached to a hose 520 connected to the air switch 522 for activating the air cylinder 524. The manual air switch 504 has a first position and a second position. When the manual switch 504 is selected to the first position, compressed air is allowed to flow from the tractor air tank 514 to the air switch 522 while air flow between the trailer air tank 518 and the air switch 522 is prevented. When the manual switch 504 is selected to the second position, compressed air is allowed to flow from the trailer air tank 518 to the air switch 522 while air flow between the tractor air tank 514 and the air switch 522 is prevented. Therefore, the operator can select to use the tractor air tank 514 as the air source to activate the air cylinder 524 by moving the manual switch 504 to the first position or select to use the trailer air tank 518 as the air source to activate the air cylinder 524 by moving the manual switch 504 to the second position.

Similar to the ninth embodiment, the use of shut-off valves would be desirable to prevent a sudden loss of pressure to one or both air tanks. Two shut-off valves 526, 528 may used to prevent loss of pressure in the air tanks 514, 518. One shut-off valve 526 is located between the tractor air tank 514 and the manual air switch 504 while the other shut-off valve 528 is located between the trailer air tank 518 and the manual air switch 504. Alternatively, only one shut-off valve 530 located between the manual air switch 504 and the air switch 522 for activating the air cylinder 524 may be used to prevent loss of pressure in the air tanks 514, 518.

Figure 19:
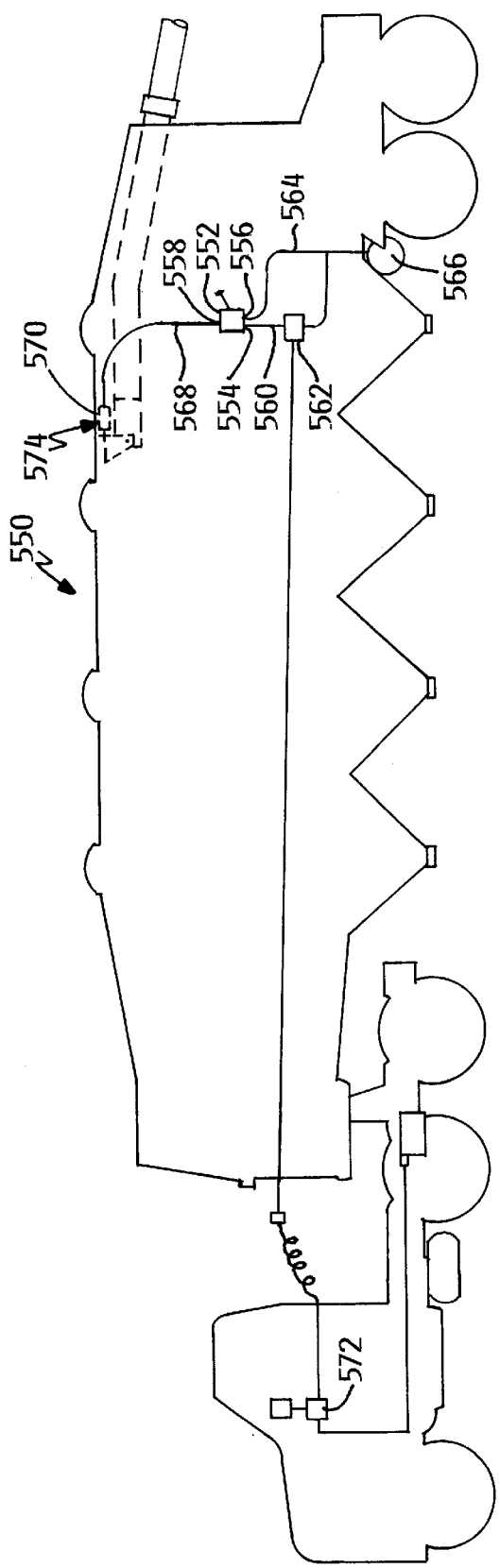
FIG. 19 is a schematic of an automated mechanism for operating a load distribution deflector assembly having a by-pass switch to by-pass the automated mechanism, in accordance to an eleventh embodiment.

A manual air switch may also be used to by-pass the controller of an automated deflector mechanism. A by-pass switch is particularly useful when the controller is not operating properly or the programmed front to rear load distribution is not appropriate for this particular load of dry bulk. Such a by-pass switch is incorporated in the eleventh embodiment of the present invention and is illustrated in FIG. 19.

The eleventh embodiment of the present invention is similar to the deflector assembly of the ninth embodiment with the exception of a by-pass switch located between the air switch and the air cylinder. The by-pass switch 552 has two inlet fittings 554, 556 and one outlet fitting 558. One inlet fitting 554 is attached to a hose 560 connected to an air switch 562. The other inlet fitting 556 is attached to a hose 564 connected to a trailer air tank 566 located on the trailer 550. The outlet fitting 558 is attached to a hose 568 connected to the air cylinder 570.

The by-pass switch 552 has a first position, a second position and a closed position. When the by-pass switch 552 is selected to the first position, compressed air is allowed to flow from the air switch 562 to the air cylinder 570 while air flow directly between the trailer air tank 566 and the air cylinder 570 is prevented. When the by-pass switch is selected to the second position, compressed air allowed to flow directly from the trailer air tank 566 to the air cylinder 570 while air flow between the air switch 562 to the air cylinder 570 is prevented. When the by-pass switch 552 is selected to the closed position, compressed air is prevented to flow from both the air switch 562 and the trailer air tank 566 to the air cylinder 570. Therefore, the operator can select to use the controller 572 to automatically control the air cylinder 570 of the deflector assembly 574 by moving the by-pass switch 552 to the first position. Alternatively, the operator can select to operate the deflector assembly 574 independently of the controller 572 by moving the by-pass switch 552 to the second position.

Various features of the present invention have been described with reference to the above embodiments. It should be understood that modification may be made without departing from the spirit and scope of the invention as represented by the following claims. For example, while the above embodiments disclose the deflector and the deflector positioning mechanism are attached to a sleeve mounted to the end of the loading line, the deflector and the deflector positioning mechanism can also be directly attached to the loading line without the need for a sleeve.

What is claimed is:

1. A deflector assembly located within the interior of a trailer for distributing dry bulk during loading of the dry bulk into the interior of the trailer, said deflector assembly comprising:

a deflector having a deflecting surface capable of deflecting the dry bulk being loaded into the interior of the trailer; and an air cylinder, wherein said deflector moves from an opened position to a deflecting position upon a flow of compressed air from an air source to said air cylinder.

2. The deflector assembly as claimed in claim 1 wherein the deflecting surface is not situated to deflect dry bulk when the deflector is in the opened position and the deflecting surface is situated to deflect dry bulk when the deflector is in the deflecting position.

3. The deflector assembly as claimed in claim 1 wherein said air source is an air tank located on the trailer.

4. The deflector assembly as claimed in claim 1 wherein said air source is an air tank located on the tractor.

5. The deflector assembly as claimed in claim 1 further comprising a switch allowing said air source to be either an air tank located on the trailer or an air tank located on the tractor.

6. The deflector assembly as claimed in claim 1 further comprising a shut-off valve situated between said source and air cylinder, said shut-off valve shuts off the flow of compressed air when the flow rate exceeds a predetermined value.

7. A deflector assembly for distributing dry bulk exhausted out of a loading line during loading of the dry bulk into the interior of a trailer, said deflector assembly comprising a deflector to deflect the dry bulk, said deflector able to pivot from an opened position to a deflecting position, said deflector is not situated to deflect dry bulk when the deflector is in the opened position and the deflector is situated to deflect dry bulk when the deflector is in the deflecting position, said deflector flares outwardly from the pivot end of said deflector to provide more distribution of dry bulk towards the sides of the trailer.

8. The deflector assembly as claimed in claim 7 wherein said deflector pivots relative to the loading line.

9. The deflector assembly as claimed in claim 7 further comprising a deflector positioning mechanism for moving said deflector from said opened position to said deflecting position.

10. The deflector assembly as claimed in claim 9 wherein said deflector positioning mechanism is an air cylinder.

11. The deflector assembly as claimed in claim 9 wherein said deflector positioning mechanism is an electric motor.

12. The deflector assembly as claimed in claim 7 wherein said deflector assembly is adapted to be mounted to the end of the loading line.

13. The deflector assembly as claimed in claim 12 further comprising a sleeve slidably mounted to the end of the loading line, said deflector is mounted to said sleeve.

14. The deflector assembly as claimed in claim 7 wherein said deflector positioning mechanism is mounted to said sleeve.

15. The deflector assembly as claimed in claim 7 further comprising a switch for activating said deflector positioning mechanism.

16. The deflector assembly as claimed in claim 7 wherein a portion of said deflector is situated in front of an outlet opening of the loading line when the deflector is in the deflecting position.

17. The deflector assembly as claimed in claim 7 wherein the dry bulk is deflected downward when the deflector is in the deflecting position.

18. A deflector assembly located within the interior of a trailer for distributing dry bulk during loading of the dry bulk into the interior of the trailer, said deflector assembly comprising:

a deflector having a deflecting surface capable of deflecting dry bulk loaded into the interior of the trailer, said deflector having an opened position and a deflecting position;

a sensor for determining the distribution of loaded dry bulk at front of the trailer verses loaded dry bulk at rear of the trailer;

a controller for activating deflector assembly to move said deflector from one of said opened position and said deflecting position to other of said opened position and said deflecting position upon the distribution of loaded dry bulk at front of the trailer verses loaded dry bulk at rear of the trailer reaches a given value.

19. The deflector assembly as claimed in claim 18 further comprising a by-pass switch for activating deflector assembly independently of said controller.

* * * * *